United States Patent Office 3,084,199
Patented Apr. 2, 1963

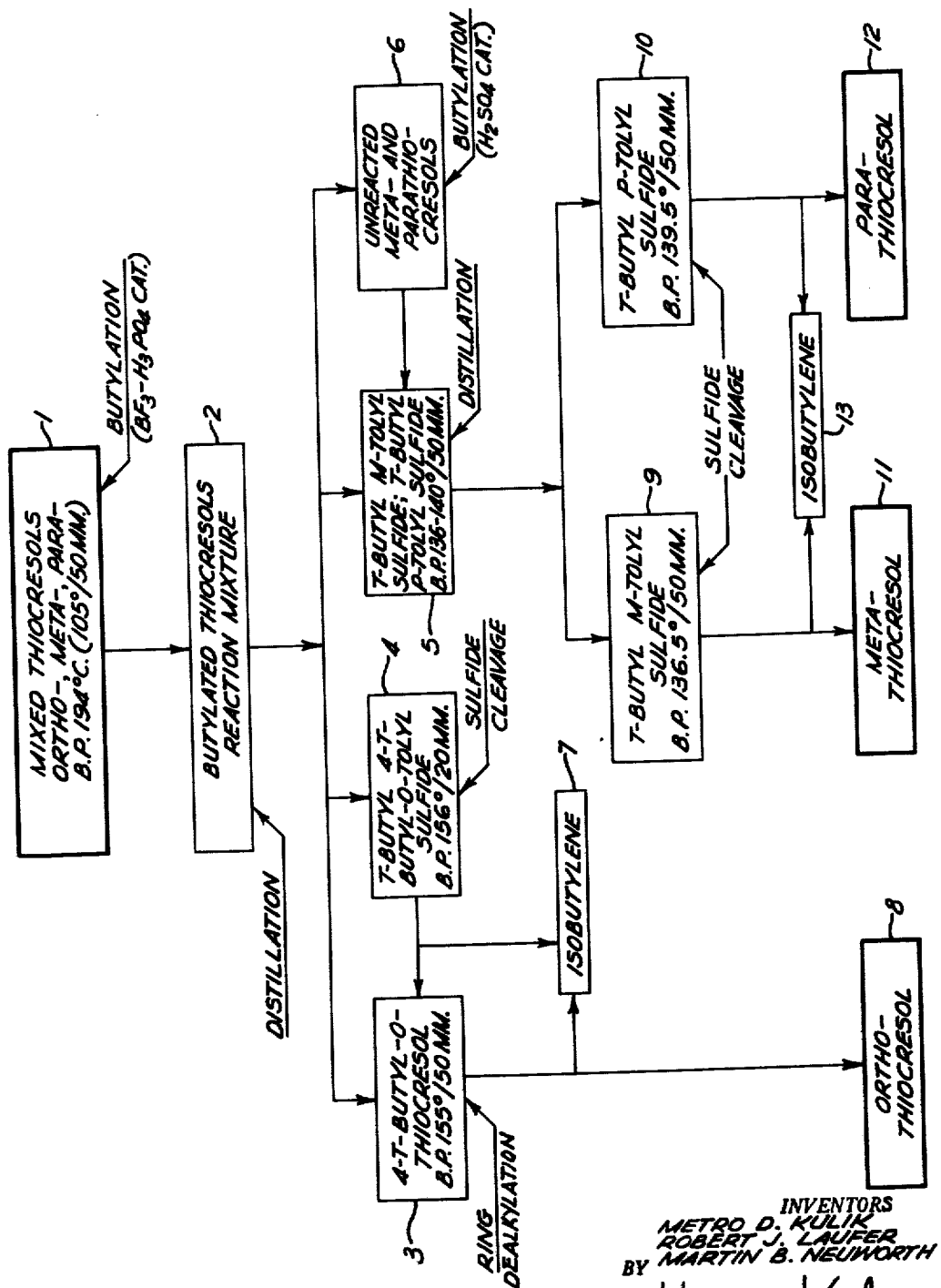

3,084,199
SEPARATION OF THIOCRESOL ISOMERS
Metro D. Kulik, Robert J. Laufer and Martin B. Neuworth, Pittsburgh, Pa., assignors to Consolidation Coal Company, Pittsburgh, Pa., a corporation of Pennsylvania
Filed Nov. 21, 1960, Ser. No. 70,657
22 Claims. (Cl. 260—609)

This invention relates to the refining of mixtures. Specifically, it relates to the separation and recovery of individual thiocresol isomers from a mixture containing these isomers. More particularly, it relates to the recovery of individual thiocresol isomers in high purity and in high yield by a novel alkylation-dealkylation process. The initial mixture may contain the thiocresol isomers as such, or as their t-alkyl sulfides, or a combination thereof.

Commercial quantities of mixed thiocresols (toluenethiols), containing ortho-, meta-, and parathiocresols, are available as by-products of the refining of cresylic acid-thiophenol mixtures derived from the caustic washing of gasoline. No methods for the separation of individual thiocresol isomers from mixed thiocresols are known. Heretofore, to obtain individual thiocresol isomers, synthesis at a relatively high cost has been required.

In marked contrast with their cresol or xylene analogs, the three thiocresol isomers boil at essentially the same temperature, precluding their separation by high efficiency fractional distillation. Fractional crystallization techniques are not of interest because typical thiocresol mixtures contain the highest melting isomer, parathiocresol (M.P. 43–44° C.), in lowest concentration. Therefore, an impractically large number of freezing and thawing stages would be required. This invention provides the first means for separating a commercial mixture of thiocresols into their individual isomers.

Accordingly, it is an object of the present invention to refine mixtures containing thiocresols and their t-alkyl sulfides.

It is a further object to provide a method for separating any thiocresol isomer from a mixture containing two or more thiocresol isomers or t-alkyl sulfides thereof.

It is yet a further object to provide a method for recovering orthothiocresol from mixed thiocresols.

It is still another object to provide a method for separating meta- and parathiocresols from orthothiocresol and from each other.

It is yet another object to provide a method for recovering individual thiocresol isomers from a mixture of their t-alkyl sulfides.

In its broadest aspect, the process of this invention is applicable to separating the individual components of an initial mixture containing thiocresol isomers or the t-alkyl sulfides of these isomers. In a first aspect, the initial mixture contains the thiocresol isomers as such. In a second aspect, the components of a mixture containing the t-alkyl sulfides of the thiocresol isomers are separated.

In accordance with the first and principal aspect of this invention, a mixture of thiocresol isomers is reacted with a t-alkyl-generating olefin having from 4 to 12 carbon atoms in the presence of a ring-alkylating catalyst. Orthothiocresol is alkylated in the para position of the ring, whereas the meta- and parathiocresols form only their t-alkyl sulfides. The reaction products are separated by fractional distillation. Orthothiocresol is recovered by ring dealkylation of the 4-t-alkyl-o-thiocresol. Meta- and parathiocresols are recovered by separate sulfide cleavage of their respective t-alkyl sulfides.

The term "t-alkyl-generating olefin" refers to an olefin capable of generating or yielding a tertiary alkyl group as a substituent in an alkylation reaction. Exemplary are isobutylene yielding a t-butyl group, methylbutene yielding a t-amyl group, and the like. "Ring dealkylation," as used herein, refers to removal of a t-alkyl group from the para position of the ring of a 4-t-alkyl-o-thiocresol. The methyl group at the ortho position of the ring is not affected. By the term "sulfide cleavage" as used herein, reference is made to the removal of a t-alkyl group attached to the sulfur atom of an S-substituted thiophenol whereby the thiophenol is formed.

More specifically, isobutylene is used as a preferred alkylating agent. Where all three thiocresol isomers are initially present, the resulting butylated reaction mixture consists principally of 4-t-butyl-o-thiocresol, t-butyl m-tolyl sulfide, and t-butyl p-tolyl sulfide. The ring-butylated o-thiocresol is separated from the two butylated sulfides by fractional distillation. The 4-t-butyl-o-thiocresol is then debutylated under ring dealkylation conditions to convert it to o-thiocresol. The t-butyl m-tolyl sulfide and t-butyl p-tolyl sulfide may be separated from each other by fine fractional distillation. The individual sulfides are then converted respectively to m-thiocresol and p-thiocresol by sulfide-cleavage debutylation techniques. Thereby, by this process, a mixture of thiocresol isomers may be separated into their individual isomeric components and recovered in high yield and in high purity.

Using isobutylene as preferred alkylating agent, the process of this invention is applicable to the separation and recovery in high purity of any one individual thiocresol isomer or t-butyl sulfide thereof. For example, thiocresols may be synthesized by reacting chlorosulfonic acid with toluene to produce a mixture of ortho- and para-substituted sulfonyl chlorides. Meta substitution does not occur. Upon reduction of the sulfonyl chlorides with a suitable reducing agent, e.g., metal-acid, a mixture of ortho- and parathiocresols is obtained. The process described herein in either of its aspects may be readily applied to the separation of such a mixture.

For a more detailed description of this invention, in accordance with the objects and features thereof, reference should be made to the sole figure of the drawing, which is a diagrammatic flow sheet of the steps involved in practicing a preferred embodiment of a first aspect of the process of this invention.

This first aspect of the process of this invention is particularly applicable to the separation of mixed thiocresols obtained from the fractionation of crude aromatic mercaptans, a by-product of the refining of crude cresylic acids, as shown, for example, in U.S. Patent 2,767,220. Approximately half of the distillate obtained from the fractionation of the aromatic mercaptans consists of thiocresols, which, after treatment for the removal of tar acid contaminants, typically contain an isomer distribution of 35–40 percent ortho, 43–48 percent meta, and 15–17 percent para by weight. A preferred aspect of the process of this invention will therefore be described with respect to the separation of such mixtures.

Referring to the drawing, mixed thiocresols (block 1) consist of a mixture of ortho-, meta-, and para- thiocresols having a boiling point at 760 mm. Hg of approximately 194° C. In order to obtain individual isomers of high purity, it is preferred to remove any traces of tar acid contaminants before further treatment of the mixed thiocresols. Such tar acid contaminants may be readily removed by prior treatment in accordance with the processes set forth in U.S. Patents 2,954,403, 2,954,404, and 2,957,029.

The mixed thiocresols (block 1) are preferably butylated, and preferably in the presence of boron trifluoride-phosphoric acid complex as catalyst to form the reaction mixture of butylated thiocresols (block 2). In copending applications Serial No. 70,413, Serial No. 70,405, and Serial No. 70,443, filed of even date herewith, are described methods for the ring alkylation of thiophenols using t-alkyl-generating olefins as ring-alkylating agents under selected ring-alkylating conditions. The t-alkyl group will substitute in only the para position of the ring. If either the meta or para position is blocked, no ring substitution will take place; only sulfides, i.e., thioethers will be formed. The methods described in these copending applications may be generally used for the treatment of mixed thiocresols in accordance with this invention. Only the o-thiocresol isomer will be alkylated in the para position of the ring, the meta- and parathiocresols forming their t-alkyl sulfides.

In practicing the present invention, optimum results are obtained using isobutylene as an alkylating agent. Thus while other t-alkyl-generating alkylating agents may be used, there is little economic incentive to employ any other than isobutylene because of the relative inefficiency of these other alkylating agents with respect to conversion and yield. Also, higher molecular weight alkylating agents result in products having higher boiling points; these higher boiling isomeric products generally have smaller differences in boiling point among them, thereby making separation by fine fractional distillation more difficult.

In order to obtain the individual thiocresol isomers in high purity and in high yields, butylation conditions affording maximum selectivity and conversion are desired. To obtain the most efficient separation of the thiocresol isomers, the ring-alkylating catalyst used with the isobutylene should permit essentially complete ring butylation of the o-thiocresol, with only negligible amounts of t-butyl o-tolyl sulfide being formed. Thus, under optimum alkylating conditions, only the 4-t-butyl-o-thiocresol (block 3) and minor amounts of its sulfide, namely t-butyl 4-t-butyl-o-tolyl sulfide (block 4), will be formed, with essentially no formation of t-butyl o-tolyl sulfide occurring. Ideally, at the same time, the meta- and parathiocresols would be completely converted to their mixed t-butyl sulfide (block 5). However, optimum conditions for butylation of the o-thiocresol will not ordinarily result in complete conversion of the meta- and parathiocresols to their t-butyl sulfides. Any unreacted meta- and parathiocresols (block 6), which may be readily recovered by distillation from the reaction mixture as a low-boiling fraction, may be converted to their t-butyl sulfides by further reaction with isobutylene in the presence of any suitable alkylation catalyst. Since only sulfide formation can occur, a conventional non-selective catalyst, i.e., one not capable of functioning with respect to ring alkylation of a thiophenol, may be used. Sulfuric acid is exemplary of a catalyst promoting only sulfide formation.

The sulfide of 4-t-butyl-o-thiocresol, namely, t-butyl 4-t-butyl-o-tolyl sulfide (block 4), that is formed in minor amounts during the butylation reaction, may also be readily separated from the reaction mixture because of its higher boiling point. This compound may then be cleaved by sulfide-cleavage techniques to provide additional amounts of 4-t-butyl-o-thiocresol (block 3) and isobutylene (block 7). The 4-t-butyl-o-thiocresol is also readily separable from the reaction mixture by distillation. The t-butyl group of this compound may then be cleaved from the ring by ring-dealkylation techniques to form o-thiocresol (block 8) and isobutylene (block 7). The t-butyl m-tolyl sulfide (block 9) and t-butyl p-tolyl sulfide (block 10) may be individually obtained by first being separated from the butylated reaction mixture (block 2) by fractional distillation into the sulfide mixture (block 5), followed by separation from each other by fine fractional distillation. Each of these compounds is then separately cleaved by sulfide-cleavage techniques to provide m-thiocresol (block 11) and p-thiocresol (block 12), respectively, and isobutylene (block 13).

Particularly preferred conditions for butylating o-thiocresol in the para position of the ring with maximum formation of C-butyl product (ring) and minimum formation of S-butyl product (sulfide) are described in copending application Serial No. 70,443, and reference should be made thereto for additional details. These particularly preferred alkylation conditions for the isomer separation process include a molar ratio of isobutylene to thiocresol of 0.75–1:1, a reaction temperature between 75 and 100° C., and a catalyst concentration of the boron trifluoride-phosphoric acid complex of approximately between 8 and 12 weight percent based on the total thiocresols charged. A reaction time of between 2 and 6 hours is usually sufficient for optimum butylation results.

The following equations represent the predominant reactions which occur under preferred conditions for practicing the invention:

1. SELECTIVE BUTYLATION (BLOCK 1)

a. *Ortho*

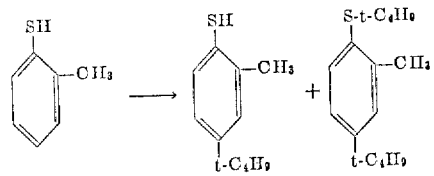

b. *Meta*

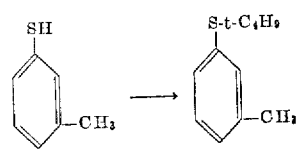

c. *Para*

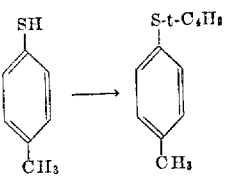

2. RING DEALKYLATION (BLOCK 3)

*Ortho*

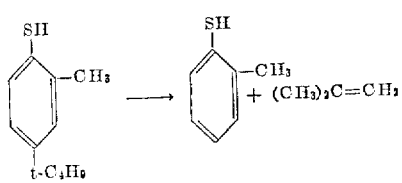

3. SULFIDE CLEAVAGE a. *Ortho (Block 4)*

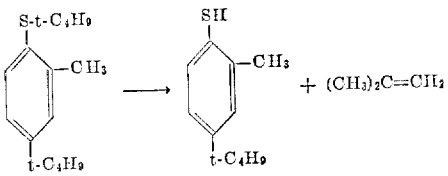

b. *Meta (Block 9)*

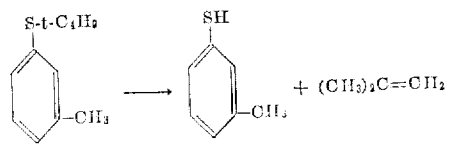

c. *Para* (Block 10)

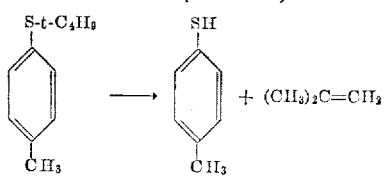

I. ALKYLATION

All three thiocresol isomers are capable of S-alkylation, i.e., sulfide formation. This will occur when t-alkyl-generating olefins are used as alkylating agents in the presence of non-selective catalysts such as zinc chloride, antimony trichloride, titanium tetrachloride, sulfuric acid, phosphoric acid, and ferric chloride. However, since the sulfides of o-thiocresol and m-thiocresol boil together and cannot be separated by fine fractional distillation, this method does not provide a means for separating o-thiocresol and m-thiocresol.

It has been discovered, as set forth in the aforementioned copending applications, that certain catalysts are capable of ring-alkylating o-thiocresol in its para position under selected ring-alkylating conditions. Under these same conditions, the meta- and parathiocresols are converted only to their sulfides, no ring alkylation occurring. t-Alkyl-generating olefins may be used for effecting both the ring alkylation of the orthothiocresol and the S-alkylation of the meta- and parathiocresols. In copending application Serial No. 70,443, the use of boron trifluoride as a selective alkylation catalyst is described. In copending application Serial No. 70,405, the use of a selective alkylation catalyst selceted from the class consisting of anhydrous aluminum chloride, aluminum bromide, aluminum iodide, and zirconium tetrachloride is described. In copending application Serial No. 70,443 is described the use of boron trifluoride-phosphoric acid complex as selective alkylation catalyst.

While the foregoing selective catalysts may be used in the practice of this invention using a t-alkyl-generating unsaturated aliphatic hydrocarbon having from 4 to 12 carbon atoms as alkylating agent, it has been found that the use of isobutylene in the presence of boron trifluoride-phosphoric acid complex as catalyst minimizes formation of the sulfides of o-thiocresol while at the same time provides a high yield of ring-butylated o-thiocresol. Isobutylene is also preferred as alkylating agent because yields with this compound are usually greater than those obtained with higher molecular weight alkylating agents and the reaction products obtained are more readily handled, being lower boiling and having a greater differential in boiling range among them. The use of boron trifluoride-phosphoric acid complex as catalyst is preferred inasmuch as this catalyst is highly selective and yet does not degrade the thiocresols, despite the marked sensitivity of thiophenols to degradation in the presence of strong acid-type catalysts. Furthermore, this catalyst is insoluble in the alkylated thiocresol reaction products, and therefore may be readily recovered from the system by simple decantation and effectively reused. Reuse of boron trifluoride is ordinarily impracticable because recovery of a gas from a pressurized system is difficult and separation of the gas from other evolved gases may also be required. Recovery of aluminum chloride from the reactant system is not feasible because of its ready solubility in thiophenols. Thus, the preferred catalyst of this invention is uniquely adapted to the separation of thiocresol isomers.

This preferred catalyst is essentially a liquid equimolar complex of boron trifluoride and phosphoric acid. While the catalyst may be prepared from 85 percent phosphoric acid, the phosphoric acid of commerce, optimum results are generally obtained in the ring alkylation when the catalyst is prepared starting with 100 percent phosphoric acid. Using this latter catalyst, considerably higher yields of ring alkylated o-thiocresol are obtained. The boron trifluoride-phosphoric acid complex may be prepared by various methods known to the art. Conveniently, it may be prepared by bubbling boron trifluoride gas through 100 percent phosphoric acid. An equimolar complex results. If a deficiency of boron trifluoride gas is used, then phosphoric acid is associated with the catalyst complex. If an excess of boron trifluoride gas is added, under pressurized conditions, the gas will go into solution in the complex and subsequently be evolved from the liquid upon release of pressure.

In order to maximize the yield of the 4-t-butyl-o-thiocresol formed, a molar ratio of 0.75–1:1 of alkylating agent to o-thiocresol is preferred, a ratio of 0.80:1 being considered optimal. If the ratio falls below 0.75, conversion of o-thiocresol decreases. If the ratio rises above 1, i.e., above equimolar quantities of the reactants, total conversion of o-thiocresol may increase, but formation of t-butyl o-tolyl sulfide may be promoted at the expense of the 4-t-butyl-o-thiocresol. Ordinarily, the use of large excesses of isobutylene and long reaction times does not give improved conversions, but rather leads to undesired side reactions such as the formation of high-boiling materials possibly derived from polymerization of the isobutylene. At reaction times below an hour, at a temperature of 80° C., both conversion of the o-thiocresol and yield of 4-t-butyl-o-thiocresol tend to decrease.

The S-alkylate products of o-thiocresol formed generally consist of t-butyl o-tolyl sulfide and t-butyl 4-t-butyl-o-tolyl sulfide. The formation of the latter sulfide is usually favored when a molar excess of isobutylene is used. Reaction conditions are selected so as to minimize formation of the t-butyl o-tolyl sulfide.

If excess amounts of t-butyl o-tolyl sulfide are formed, together with the m-tolyl and p-tolyl sulfides, the reaction mixture may be reacted with additional quantities of catalyst under ring-alkylating conditions so as to convert the t-butyl o-tolyl sulfide to ring-butylated o-thiocresol by migration of the t-butyl group from the S-atom to the ring. The m-tolyl and p-tolyl sulfides do not react. This conversion of the t-butyl o-tolyl sulfide to' ring-butylated o-thiocresol may be carried out at atmospheric pressure or at greater than atmospheric pressure and at a temperature between 50 and 120° C. A temperature between 75 and 100° C. is considered optimal. Lower temperatures require correspondingly greater reaction times to provide comparable conversions and yields.

The catalyst concentration required for either the ring alkylation of o-thiocresol or the conversion of its t-alkyl sulfide to ring-alkylated o-thiocresol may vary from 2 to 25 percent by weight based on the o-thiocresol present. Amounts from 8 to 12 percent are preferred. Where the catalyst concentration is too low, both the total conversion and the yield of C-alkyl product falls off.

Obviously, the various reaction parameters such as temperature, time, and reactant proportions are interrelated. Depending upon specific reaction conditions, a reaction time of as little as half an hour may be employed. In general, reaction times between 2 and 6 hours are preferred. Under optimum conditions of temperature and of catalyst concentration, as well as optimum isobutylene to o-thiocresol ratio, an increase in the reaction time beyond 3 hours (after addition of the isobutylene and after attainment of selected reaction temperature) gives little increase in yield of 4-t-butyl-o-thiocresol at the expense of the by-product sulfides.

II. DISTILLATION

Under preferred reaction conditions, using isobutylene as alkylating agent, the reaction mixture of butylated thiocresols ordinarily contains, in order of increasing boiling point, unreacted meta- and parathiocresols, t-butyl m-tolyl sulfide, t-butyl p-tolyl sulfide, 4-t-butyl-o-thio-cresol, and t-butyl-4-t-butyl-o-tolyl sulfide. Under preferred reaction conditions, essentially all of the o-thiocresol is converted, with none of the converted product consisting of t-butyl o-tolyl sulfide. On fractional distillation of the reaction mixture, the unreacted thiocresols, which boil at 105° C. at 50 mm. Hg pressure, are the first to be recovered from the reaction mixture. The t-butyl m-tolyl and p-tolyl sulfides are next recovered, boiling at 137° C. at 50 mm. Hg pressure. The 4-t-butyl-o-thiocresol boiling at 155° C. at 50 mm. Hg pressure is next recovered, followed by the highest boiling t-butyl 4-t-butyl-o-tolyl sulfide (B.P. 156° C. at 20 mm. Hg pressure). The isomers in the fraction consisting of the t-butyl m-tolyl and p-tolyl sulfides show a 3° C. boiling point difference under 50 mm. Hg pressure. The butylated sulfides may be separated into their individual isomers by fine fractional distillation using about 50 to 75 theoretical plates to achieve a fractionation into t-butyl m-tolyl sulfide, B.P. 136.5° C. (50 mm. Hg) and t-butyl p-tolyl sulfide, B.P. 139.5° C. (50 mm. Hg).

III. RING DEALKYLATION

The ring dealkylation of the 4-t-alkyl-o-thiophenols, i.e., removal of the t-alkyl group from the para position of the ring, is accomplished in the presence of a ring dealkylation acid catalyst at elevated temperatures between 200 and 300° C. Specific ring-dealkylation processes are disclosed and claimed in the copending applications of M. D. Kulik and M. B. Neuworth, S.N. 94,160, and of R. J. Laufer, S.N. 94,162, both filed March 8, 1961, and assigned to the assignee of the present application. A preferred class of solid acid catalysts which are highly selective for the ring dealkyltion of t-alkyl-thiophenols and do not degrade the ring-alkylated thiocresol includes solid phosphoric acid, anhydrous zinc chloride, and natural and synthetic acid clays. Exemplary of effective natural clays are the activated acid-washed bentonites or related montmorillonite-containing clays. These should be relatively free of impurities. Among synthetic clays are included silica-alumina, silica-magnesia, and alumina-boria. These acidic activated natural clays and synthetic clays, as well as solid phosphoric acid and zinc chloride, are known to the art as catalytic agents in the cracking of gas oil and are commercially available.

Catalysts prepared by activating natural clays by acid treatment are commercially available under the trade names of Filtrol, Super-Filtrol, and the like. The acidic silica-alumina and related synthetic clay catalysts are readily prepared. For conversion of silica to an acidic catalyst, the addition of only a small proportion of alumina (less than one weight percent) is needed, although commercial catalysts may contain as much as 25 weight percent of alumina, usually about 5 to 20 weight percent. Silica-alumina catalyst is exemplary of a preferred one of the synthetic acid clays, which also include alumina-boria and silica-magnesia catalysts. These catalysts may be prepared by methods known to the art, as for example, by precipitating silica from a solution of sodium silicate, preferably removing the sodium ions, and depositing thereon or admixing therewith alumina, magnesia, or the like. The catalyst must be acidic in nature. The acid strength of solid materials can be readily determined by the method of Cheves Walling [J. Am. Chem. Soc. 72, 1164 (1950)] or other methods known in the art. To these clay-type catalysts may be added various promoters, such as zirconia, thoria, vanadia, and the like. Such promoters usually do not constitute more than 15 percent of the catalyst, generally from about 1 to about 10 percent thereof. A suitable silica-alumina catalyst is commercially available under the trade name of Houdry S-16.

Solid phosphoric acid catalyst, as this term is used in the art, refers to a solid porous granular material, e.g., kieselguhr, silica-gel, etc., which has been impregnated with an acid of phosphorus, e.g., phosphoric acid, and then calcined to produce a desired lower state of hydration of the catalyst. The nature and preparation of solid phosphoric acid catalysts are well known in the polymerization art, and numerous prior disclosures set forth the features of these catalysts. One such commercially available solid phosphoric acid catalyst is known as UOP #2.

It has been found that solid phosphoric acid catalyst is particularly effective in debutylating 4-t-butyl-o-thiocresol with minimal degradation of the ring-butylated thiophenol and with almost complete conversion of the 4-t-butyl-o-thiocresol to o-thiocresol and isobutylene. This debutylation proceeds satisfactorily at a temperature between 200 and 300° C., and preferably at a temperature between 225 and 250° C. at atmospheric pressure. Atmospheric conditions are convenient and preferred, particularly since with this catalyst essentially no degradation of the thiophenol occurs at the elevated temperatures used. A catalyst concentration of from 2 to 20 percent by weight of the 4-t-butyl-o-thiocresol is suitable, with a concentration between 5 and 15 percent by weight being preferred.

In general, since ring dealkylation of a t-alkyl group requires a much higher temperature than cleavage of the t-alkyl group from the sulfur atom (sulfide cleavage), all non-degrading catalysts effective for ring dealkylation are equally suitable for sulfide cleavage; the converse does not necessarily apply. In certain instances, e.g., debutylation of t-butyl 4-t-butyl-o-tolyl sulfide, it is feasible to accomplish both sulfide cleavage and ring dealkylation in the same operation, the sulfide cleavage occurring first followed by ring dealkylation. However, because this may lead to the formation of undesired side products, it is preferable to first cleave the t-butyl group from the sulfur atom of the foregoing compound, forming 4-t-butyl-o-thiocresol, isolating this latter compound, and then ring dealkylate the remaining t-butyl group.

IV. SULFIDE CLEAVAGE

The catalysts suitable for ring dealkylation are equally effective for sulfide cleavage since this latter cleavage is degradatively less severe and occurs at a lower temperature. Therefore, effective ring-dealkylation catalysts which do not desulfurize or otherwise degrade the thiophenol at more elevated temperatures are particularly suitable for use as sulfide-cleavage catalysts at these lower temperatures. The use of solid phosphoric acid is also preferred for the sulfide cleavage because of its high degree of effectiveness in cleaving a t-alkyl group attached to the sulfur atom while at the same time causing no desulfurization of the compound. Other suitable acid catalysts that may be used include the natural and synthetic acid clays, aluminum phenoxide, aluminum o-cresoxide, 85 or 100 percent phosphoric acid, anhydrous zinc chloride, anhydrous sulfonic acids, and the like. It is observed that various of these catalysts are effective to different degrees; e.g., some of the aluminum phenoxide catalyst reacts with the olefin formed. With all the foregoing acid catalysts, where a t-butyl group is cleaved, isobutylene, as well as some dimer and polymer, is formed and may be recovered from the reaction system.

Specific sulfide-cleavage processes are disclosed and claimed in the following copending applications: M. D. Kulik and M. B. Neuworth, S.N. 94,164; R. J. Laufer, S.N. 94,163; and R. J. Laufer and M. B. Neuworth, S.N. 94,161; all filed March 8, 1961, and assigned to the assignee of the present application.

Sulfide cleavage may also be accomplished by using a reducing agent, e.g., an alkali metal dissolved in a nitrogenous solvent. Exemplary are sodium-liquid ammonia, sodium-pyridine, and lithium-alkylamines. The temperature at which these reducing agents are employed is generally determined by the boiling point of the solvent; e.g., sodium-liquid ammonia is generally used at −33° C., the atmospheric boiling point of ammonia, pyridine is used at 115° C., its reflux temperature, etc.

These reducing agents are basic in nature and operate by a different mechanism from the acid catalysts in that the t-alkyl group is hydrogenated as well as cleaved. Thus when the t-butyl group is cleaved, isobutylene is not formed, but rather butanes and octanes primarily. These basic reducing agents are not ordinarily as desirable for use as the acid catalysts because isobutylene is not recoverable, and also the use of these alkali metal-solvent pairs is less convenient compared with use of the solid acid-type catalysts.

In the sulfide cleavage of the t-butyl group from either m-tolyl or p-tolyl t-butylated sulfides or from t-butyl 4-t-butyl-o-tolyl sulfide, solid phosphoric acid is preferred as catalyst, a temperature between 130 and 250° C. being suitable; a preferred temperature giving high yields and minimal degradation is between 160 and 170° C. at 200 mm. Hg pressure. Reduced pressure is employed to permit the products to distill from the system as formed; at the same time an adequate reaction temperature is maintained. A catalyst concentration between 2 and 20 percent by weight of the sulfide is suitable, with a concentration between 5 and 15 percent being preferred.

In a second aspect of this invention, a mixture of thiocresol isomers is reacted with a t-alkylating agent, preferably isobutylene, under alkylating conditions in the presence of a non-selective alkylating catalyst to provide a mixture consisting principally of the t-alkyl sulfides of all thiocresol isomers present. Where isobutylene is used, a partial separation of the butylated sulfides may be obtained by fine fractional distillation, with t-butyl o-tolyl sulfide and t-butyl m-tolyl sulfide boiling together as the lower boiling fraction and t-butyl p-tolyl sulfide constituting the higher boiling fraction. Parathiocresol may be recovered from the t-butyl p-tolyl sulfide by a sulfide-cleavage debutylation technique. Similarly, the mixture of o-tolyl and m-tolyl t-butylated sulfides may be debutylated by a sulfide-cleavage technique to yield a mixture of o-thiocresol and m-thiocresol. For separation of these latter two thiocresol isomers, processing in accordance with the first aspect of this invention would be required; i.e., the o-thiocresol would be converted to-4-t-butyl-o-thiocresol, and the m-thiocresol would be converted to t-butyl m-tolyl sulfide. The reaction products would then be separated by distillation and individually debutylated.

Alternatively, the mixture of t-butyl o-, m-, and p-tolyl sulfides may be reacted in the presence of a ring-alkylating catalyst under selected ring-alkylating conditions. The t-butyl o-tolyl sulfide will undergo isomerization to the ring-butylated isomer, 4-t-butyl-o-thiocresol, while the m- and p-tolyl t-butylated sulfides will remain inactive. The reaction products may then be separated in accordance with the first aspect of this invention.

The second aspect of this invention is of principal utility where a mixture of butylated sulfides is already present or where the recovery of p-thiocresol per se is of primary interest. It will be readily apparent from the foregoing that many different initial mixtures with respect to mixed thiocresol and sulfide content may be treated within the framework of this invention.

The following examples are intended as illustrative and expository of the invention, and are not to be considered as limitations thereof.

EXAMPLE 1

*Butylation of Mixed Thiocresols ($BF_3$-$H_3PO_4$ Catalyst)*

The catalyst was prepared by placing 85 percent $H_3PO_4$ (255 g.) into a reaction flask. Then $P_2O_5$ (99 g.) was added slowly to the vigorously stirred and cooled phosphoric acid at a rate so as to maintain the temperature below 85° C. Approximately 15 minutes was required for the $P_2O_5$ addition. The resultant 100% $H_3PO_4$ liquid was colorless and clear.

While vigorously stirring the 100% $H_3PO_4$, 246 g. of boron trifluoride ($H_3PO_4$ to $BF_3$ mole ratio of 1.0) was passed into the reaction flask at a rate of 2 grams per minute. At this boron trifluoride feed rate, the temperature leveled off at 55° C. No special cooling in the flask was therefore necessary to maintain the temperature below 120° C., at which temperature the $$BF_3\text{-}H_3PO_4$$

complex becomes unstable and begins to dissociate. The product $BF_3$-$H_3PO_4$ was a viscous light amber-colored liquid which fumed strongly when exposed to air. After cooling to room temperature, the complex was transferred to a glass-stoppered bottle and stored without any apparent gas pressure. This $BF_3$-100% phosphoric acid catalyst was used in all of the following examples where a $BF_3$-$H_3PO_4$ catalyst is specified unless otherwise shown.

Two thousand grams of mixed thiocresols (phenol free) was charged into a 5-liter flask followed by 200 g. of $H_3PO_4$-$BF_3$ catalyst. The temperature was raised to 60° C., and while maintaining vigorous stirring 720 grams of isobutylene (isobutylene/thiocresol mole ratio of 0.8) was charged at a rate of 9 g./min. The temperature was allowed to rise to 80° C. (exothermic reaction). After addition of the isobutylene was complete, the product was stirred for 3.5 hours at 80° C. Following this reaction period, the product was poured into a nitrogen-filled separatory funnel, and the catalyst, orange-red in color, was drawn off as a lower liquid phase, weighing 228 g. The supernatant liquid, protected by a nitrogen atmosphere, was neutralized with 5% $NaHCO_3$ (only 5–10 ml. required for neutralization), washed with 2000 ml. of water, decanted, and weighed (2680 g.). The crude reaction mixture was distilled through a ¾ in. x 4 ft. Cannon packed column.

The butylation of mixed thiocresols with isobutylene in the presence of $BF_3$-$H_3PO_4$ catalyst at 80° C. is a clean-cut reaction selectively ring butylating only the o-thiocresol. The formation of 4-t-butyl-o-thiocresol is favored, accompanied by about 18% of the sulfide of 4-t-butyl-o-thiocresol as t-butyl 4-t-butyl-o-tolyl sulfide. The t-butyl tolyl sulfides are derived almost entirely from the m-p-thiocresols, as shown in Table I. The unreacted thiocresols contain about 5% of the ortho isomer. However, this may be reduced by increasing the isobutylene to thiocresol ratio. The reaction products can be easily separated by fractional distillation since the boiling point difference of the various components varies from 18° to 35° C. Also, the alkylation catalyst may be recycled for several cycles. The foregoing results are summarized in Table I.

TABLE I.—BUTYLATION OF MIXED THIOCRESOLS

[Conditions: Isobutylene/thiocresol mole ratio: 0.8. Catalyst concentration: 10 weight percent $BF_3$-$H_3PO_4$ (based on thiocresols charged). 80° C.; 3.5 hours]

| Feed composition (percent by weight thiocresols) | | Thiocresols converted (percent by weight) | Product yield (mole percent based on corresponding thiocresol isomer converted) | | |
|---|---|---|---|---|---|
| | | | 4-t-butyl-o-thio-cresol | t-Butyl tolyl sulfide | t-Butyl 4-t-butyl-o-tolyl sulfide |
| Thiocresols | 100.0 | 70.0 | | 42.0 | |
| Ortho | 36.9 | 95.6 | 87.4 | 1.8 | 10.9 |
| Meta | 46.9 | 51.7 | | 82.0 | |
| Para | 16.2 | 64.8 | | 85.7 | |

EXAMPLE 2

*Butylation of Mixed Thiocresols Using $BF_3$-85% $H_3PO_4$ Catalyst*

The catalyst used for this butylation reaction was prepared by reacting equimolar stoichiometric amounts of BF$_3$ and 85 percent H$_3$PO$_4$. The isobutylene to thiocresol molar ratio was 0.8 (1340 grams isobutylene/3720 grams thiocresols). The catalyst concentration was approximately 10 percent by weight of the thiocresols (370 grams). The isobutylene was added at a temperature between 22 and 36° C. for 50 minutes, using external cooling, with the final temperature rising to 76° C. The temperature was brought to 87° C. in 42 minutes and maintained at 73–87° C. for 5 hours with continuous stirring. The reaction mixture was then cooled. The catalyst was recovered (355 grams) as a bottom layer. The organic phase was washed with water and sodium bicarbonate, azeotropically dried with toluene, and distilled.

The isomer composition of the thiocresols initially used consisted of 39.3 percent ortho, 43.9 percent meta, and 16.4 percent para. The following products were obtained: unreacted thiocresols (1211 grams): 440 grams ortho, 602 grams meta, and 169 grams para. t-Butyl tolyl sulfide (2301 grams): 326 grams ortho, 1436 grams meta, and 539 grams para. 4-t-butyl-o-thiocresol: 728 grams; t-butyl 4-t-butyl-o-tolyl sulfide: 622 grams. The data obtained are summarized in Table II.

TABLE II.—BUTYLATION OF THIOCRESOLS USING BF$_3$-85% H$_3$PO$_4$ CATALYST

[Conditions: Isobutylene/thiocresol molar ratio: 0.8. Catalyst concentration: 10 weight percent BF$_3$-85% H$_3$PO$_4$ (based on thiocresols charged). 73–87° C.; 5 hours]

| Feed composition (percent by weight thiocresols) | Thiocresols converted (percent by weight) | Product yield (mole percent based on corresponding thiocresol isomer converted) | | |
|---|---|---|---|---|
| | | 4-t-butyl-o-thiocresol | t-Butyl tolyl sulfide | t-Butyl 4-t-butyl-o-tolyl sulfide |
| Thiocresols | 99.6 | 67.2 | | 64.0 | |
| Ortho | 39.3 | 69.8 | 49.2 | 21.8 | 33.0 |
| Meta | 43.9 | 63.1 | | 96.8 | |
| Para | 16.4 | 72.2 | | 84.5 | |

As may be noted from Table II, substantial conversion of thiocresols and a relatively high yield of 4-t-butyl-o-thiocresol was obtained. Nonetheless, both the conversion of o-thiocresol and the yield of 4-t-butyl-o-thiocresol are significantly lower than is obtainable using a catalyst formed from the reaction of BF$_3$ with 100% phosphoric acid (Table I). The high selectivity in yield of ring-alkylated product using the latter catalyst is particularly marked.

EXAMPLE 3

*Butylation of Mixed Thiocresols (BF$_3$-H$_3$PO$_4$ Catalyst); Effect of Varying Parameters*

The butylation of mixed thiocresols was studied under varying conditions of catalyst concentration, catalyst life, reaction temperature, residence time, and isobutylene to thiocresol ratio. Under preferred reaction conditions: temperature between 80 and 100° C., 10 percent BF$_3$-H$_3$PO$_4$ catalyst (2 passes), and 0.9 molar isobutylene to thiocresol ratio, about 96 percent of the o-thiocresol was butylated with 69 percent being converted to 4-t-butyl-o-thiocresol and 27 percent to t-butyl 4-t-butyl-o-tolyl sulfide. This latter sulfide may be readily recycled for conversion to additional 4-t-butyl-o-thiocresol.

(A) GENERAL PROCEDURE

Highly purified (99%+) mixed thiocresols (2000 grams) were placed in a 6-liter autoclave along with the desired amount of catalyst. The mixture was raised to reaction temperature and controlled at temperature while the isobutylene was added. At the end of the scheduled reaction period, agitation was stopped and the heavier catalyst phase separated sharply from the reaction product. After the catalyst was removed, the reaction products were washed with 10 percent sodium bicarbonate until both the spent wash and the wash products were basic. The recovered catalyst was suitable for subsequent reuse.

(B) EFFECT OF TEMPERATURE

Isobutylene and the mixed thiocresols (containing 37.5 percent o-thiocresol) were reacted at a molar ratio of isobutylene to o-thiocresol of 0.9 at a catalyst concentration by weight of o-thiocresol of 10 percent. The reaction time was 3.5 hours. At a temperature of 80° C., 99.3 percent of the o-thiocresol was converted, of which 67.0 percent was 4-t-butyl-o-thiocresol (Run 3, Table III). At a temperature of 100° C., 99.5 percent of the o-thiocresol was converted, of which 74.2 percent was 4-t-butyl-o-thiocresol (Run 5, Table III). However, if the temperature is raised substantially above 120° C., the catalyst tends to become unstable.

(C) EFFECT OF ISOBUTYLENE TO o-THIOCRESOL MOLAR RATIO

The isobutylene to thiocresol molar ratio was varied between 0.5 and 1.3 while maintaining the catalyst concentration at 10 percent by weight of o-thiocresol, the reaction temperature at 80° C., and the time of reaction at 3.5 hours. At a molar ratio of 0.5, 85.2 percent of the o-thiocresol was converted, with a 90.4 percent yield of 4-t-butyl-o-thiocresol, based on converted material. At a 0.9 molar ratio, the conversion of o-thiocresol was 99.3 percent, with a yield based on converted material of 67.0 percent 4-t-butyl-o-thiocresol. At a molar ratio of isobutylene to thiocresol of 1.3, 100.0 percent conversion was obtained, with a yield of 4-t-butyl-ortho-thiocresol of 53.3 percent. Thus at lower isobutylene to thiocresol ratios, total conversion is low, but a greater proportion of 4-t-butyl-o-thiocresol is selectively produced; higher ratios give higher total conversion, but less selectivity. Hence to minimize undue recycling of sulfide, where complete conversion of o-thiocresol to 4-t-butyl-o-thiocresol is desired, a molar ratio between 0.8 and 1.0 appears optimal.

(D) EFFECT OF REACTION TIME

Inasmuch as virtually complete conversion of o-thiocresol is obtained in 3.5 hours at 80° C., longer reaction times were considered as unnecessary. For a reaction time of 1.1 hours, the total conversion fell to 78 percent, and the yield of 4-t-butyl-o-thiocresol, based on converted material, fell to 62.3 percent. Thus decreasing the residence time decreased both the total conversion as well as the yield of 4-t-butyl-o-thiocresol obtained from the converted material.

(E) CATALYST CONCENTRATION AND LIFE

The reaction was evaluated at catalyst concentrations of 2, 5, 10, and 15 percent by weight of o-thiocresol, charged. At a catalyst concentration of 2 percent by weight, only 27.8 percent of the o-thiocresol was converted; the yield obtained of 4-t-butyl-o-thiocresol based on converted material was 28.8 percent. At a catalyst concentration of 5 percent, corresponding conversions and yields were 91.8 and 65.0 percent. At catalyst concentrations of 10 percent by weight and higher, increase in catalyst concentration did not result in any marked increase in conversion or yield. The results are shown in Table III, Runs 1–4.

Because the catalyst is readily recoverable from the reaction system, reuse of catalyst was evaluated for a total of four passes at a catalyst concentration of 10 percent by weight. Conversion on the second pass was good compared with the first pass; but for the third and fourth passes, while significant, the trend wa stoward lower conversions and less selectivity, i.e., less of the o-thiocresol converted appeared as 4-t-butyl-o-thiocresol and more appeared as a sulfide. The results obtained for catalyst reuse are shown in Runs 6–8 of Table III.

TABLE III.—BUTYLATION OF MIXED THIOCRESOLS

| Run No | 1 | 2 | 3 | 4 | 5 | 6 | 7 | 8 |
|---|---|---|---|---|---|---|---|---|
| Catalyst concn., weight percent BF$_3$-H$_3$PO$_4$ | 2.0 | 5.0 | 10.0 | 15.0 | 10.0 | [1] 10.0 | [2] 10.0 | [3] 10.0 |
| Temp., °C | 80 | 80 | 80 | 80 | 100 | 80 | 80 | 80 |
| Ratio, moles isobutylene/moles o-thiocresol | 0.9 | 0.9 | 0.9 | 0.9 | 0.9 | 0.9 | 0.9 | 0.9 |
| Run time, hrs | 3.5 | 3.5 | 3.5 | 3.5 | 3.5 | 3.5 | 3.5 | 3.5 |
| Conversion of o-thiocresol, mole percent [4] | 27.8 | 91.8 | 99.3 | 99.5 | 99.5 | 93.9 | 89.6 | 75.8 |
| Conversion of o-thiocresol to 4-t-butyl-o-thiocresol, mole percent [4] | 8.0 | 59.7 | 66.5 | 70.3 | 73.9 | 64.5 | 45.1 | 44.9 |
| Yield of 4-t-butyl-o-thiocresol, mole percent (based on o-thiocresol converted) | 28.8 | 65.0 | 67.0 | 70.7 | 74.2 | 68.9 | 50.4 | 59.2 |
| Product distribution, (weight percent): | | | | | | | | |
| Thiocresol (unreacted) | 14.3 | 18.4 | 18.5 | 19.1 | 20.6 | 19.3 | 12.4 | 18.7 |
| m,p-Thiocresol butyl sulfides | 71.5 | 40.8 | 37.5 | 37.1 | 23.0 | 38.6 | 47.3 | 46.6 |
| 4-t-butyl-o-thiocresol | 3.0 | 23.3 | 27.8 | 27.4 | 27.5 | 25.2 | 16.9 | 17.3 |
| t-Butyl 4-t-butyl-o-tolyl sulfide | 10.0 | 16.2 | 14.3 | 15.0 | 12.6 | 15.0 | 21.9 | 15.5 |
| High boiling material | | | | | 15.2 | | 0.5 | 0.8 |
| Residue | 1.2 | 1.3 | 1.9 | 1.4 | 1.1 | 1.9 | 1.0 | 1.1 |

[1] Catalyst used once before.
[2] Approximate concentration; catalyst used twice before.
[3] Approximate concentration; catalyst used three times before.
[4] Based on 37.5% o-thiocresol in feed.

EXAMPLE 4

AlCl$_3$-Catalyzed t-Butylation of Thiocresols

Isobutylene was reacted with mixed thiocresols in the presence of aluminum chloride as catalyst. The molar ratio of isobutylene to total mixed thiocresols was approximately 0.75 to 1. The results obtained are reported in Table IV.

TABLE IV.—AlCl$_3$-CATALYZED t-BUTYLATION OF THIOCRESOLS [1]

| Catalyst concn. (percent by weight thiocresols) | Isobutylene addition | | Reaction conditions | | o-Thiocresole converted (percent by weight) | Product yield (mole percent based on corresponding thiocresol isomer converted) | | | | | |
|---|---|---|---|---|---|---|---|---|---|---|---|
| | Temp. (°C.) | Time (hours) | Temp. (°C.) | Time (hours) | | t-Butyl o-thiocresol | t-Butyl o-tolyl sulfide | t-Butyl m-tolyl sulfide | t-Butyl p-tolyl sulfide | t-Butyl 4-t-butyl-o-tolyl sulfide | t-Butyl toluene [2] |
| 5.0 | 30–80 | 0.6 | 80 | 5.5 | 96.5 | 47 | 0.9 | 72 | 73 | 18 | 8 |
| 5.0 | 20–64 | 1.1 | 75–80 | 12 | 97.2 | 47 | 0.4 | 74 | 86 | 13 | 8 |

[1] The mixed thiocresols contained 37.5 percent ortho isomer, 48 percent meta isomer, and 14.5 percent para isomer. Molar ratio of isobutylene to thiocresols: approx. 0.75:1. Catalyst concentration: 5.0% by weight thiocresols charged.
[2] Predominantly meta isomer. Yield based on total thiocresols converted.

EXAMPLE 5

Reaction of Metathiocresol With Isobutylene (AlCl$_3$ Catalyst)

Equimolar amounts of metathiocresol and isobutylene were reacted in the presence of 5 percent by weight of aluminum chloride (based on thiol). The isobutylene was added at a temperature between 26 and 81° C. over a period of 1.7 hours. The reaction was completed at 80° C. for 4 hours. Eighty-seven percent of the thiocresol was converted. Of the converted material, 72 percent was recovered as t-butyl m-tolyl sulfide. Essentially no ring alkylation was found to occur in any of the remaining para, meta, or ortho positions open on the ring. Thus the presence of a methyl group in the meta position, although a para position is open, effectively prevents ring alkylation, the t-alkyl group attaching itself to the sulfur atom.

EXAMPLE 6

Reaction of Thiocresol With t-Butyl Tolyl Sulfide (AlCl$_3$ Catalyst)

One part of mixed thiocresols (1.25 moles) and 3 parts of mixed t-butyl tolyl sulfides (3.75 moles) were reacted in the presence of 0.25 mole of aluminum chloride as catalyst (5.3 percent by weight of thiocresol and their sulfides). The distribution of isomers of both the thiocresols and their sulfides consisted of 36 percent ortho, 49 percent meta, and 15 percent para. Considering a mole of t-butyl tolyl sulfide as equivalent to a mole of thiocresol and a mole of isobutylene, the isobutylene (equivalent) to thiocresol (equivalent) molar ratio was therefore 0.75. No isobutylene per se was added to the reaction mixture. The reaction was completed at a temperature between 75 and 82° C. maintained for 12 hours. The conversion of o-thiocresol and its t-butyl sulfide was 98.4 percent. Based on the conversion of the corresponding thiocresol isomer, the following yields were obtained (mole percent): 4-t-butyl-o-thiocresol, 18; t-butyl o-tolyl sulfide, 0.6; t-butyl m-tolyl sulfide, 61; t-butyl p-tolyl sulfide, 62; and t-butyl 4-t-butyl-o-tolyl sulfide, 12. t-Butyl toluene (primarily the meta isomer) was obtained in 15 percent yield based on the total thiocresols converted. No ring butylated thiocresol other than t-butyl-o-thiocresol was obtained.

EXAMPLE 7

Disproportionation of t-Butyl Tolyl Sulfides in Absence of Added Thiocresols (AlCl$_3$ Catalyst)

Four moles of mixed t-butyl tolyl sulfides (35 percent ortho, 47 percent meta, and 18 percent para) were reacted with 5.3 percent by weight aluminum chloride. Since no added thiocresols were present, equimolar amounts of isobutylene (equivalent) and thiocresol (equivalent) were present. The reaction was conducted at 80° C. for 6 hours. The conversion of t-butyl o-tolyl sulfide was 98.6 percent complete. Based on the conversion of the corresponding isomer, the following yields (mole percent) were obtained: 4-t-butyl-o-thiocresol, 44; o-thiocresol, 2.1; t-butyl m-tolyl sulfide, 92; t-butyl p-tolyl sulfide, 99; and t-butyl 4-t-butyl-o-tolyl sulfide, 39. One percent of t-butyl toluene (primarily the meta isomer), based on the total thiocresols converted, was obtained. Inasmuch as no unreacted thiocresols were present, as was the case in Example 6, desulfurization was held to a minimum. It is important to note that almost half (44 percent yield based on 98.6 percent conversion) of the t-butyl o-tolyl sulfide was converted to 4-t-butyl-o-thiocresol in a single stage of reaction. Thus using the direct olefinic alkylation procedure together with the disproportionation reaction for mixed thiocresols, substantially pure 4-t-butyl-o-thiocresols may be readily recovered from the mixture by recycling formed sulfides.

EXAMPLE 8 t-Butylation of o-Thiocresol Using BF₃ as Catalyst o-Thiocresol was reacted with isobutylene at atmospheric pressure at a temperature of 100° C. for a period of two hours, boron trifluoride being bubbled through the reaction mixture. 4-t-butyl-o-thiocresol was obtained in low yield.

o-Thiocresol was also butylated at greater than atmospheric pressure. Into a 300-ml. rocking type bomb was charged 107 grams of o-thiocresol, 54 grams of isobutylene, and 10 grams of boron trifluoride catalyst. After shaking at room temperature, the pressure was 175 pounds per square inch gage. The bomb was then heated to 80° C. at a pressure of 325 pounds per square inch gage and held at 80° C. for six hours. The bomb was then cooled to room temperature overnight under pressure, and the reaction products were removed and extracted with caustic. The caustic solution was neutralized, toluene was added, and water present was removed by azeotropic distillation. The recovered material was then fractionally distilled in a ¾-inch diameter Vigreux column. Recovery of o-thiocresol was 31 grams, or 29 percent based on the o-thiocresol charged. The recovery of the 4-t-butyl-o-thiocresol was 60 grams, or 38 percent based on the o-thiocresol charged. The molar yield based on converted material was 54.4 percent.

EXAMPLE 9

Ring Dealkylation of 4-t-Butyl-o-Thiocresol 4-t-butyl-o-thiocresol, recovered by distillation from a mixture of mixed thiocresols that had been reacted with isobutylene in the presence of boron trifluoride-phosphoric acid as catalyst, was subjected to ring dealkylation over a temperature range of 215 to 300° C. It was found that higher temperatures promoted increased dealkylation of the 4-t-butyl-o-thiocresol. However, as the temperature was increased, the tendency of reactants present to form undesired side products by isomerization became more significant. In general, lower temperatures required longer contact times.

In a typical run, a sample of 4-t-butyl-o-thiocresol was contacted with 10 weight percent of solid phosphoric acid catalyst (UOP #2). The pot temperature was adjusted to 215° C., setting the system pressure at 425 mm. Hg. The reaction product, o-thiocresol, was taken overhead with sufficient reflux so as to return unreacted 4-t-butyl-o-thiocresol to the condenser, isobutylene passing through the condenser. Under optimum conditions 83.2 percent of the feed was converted in a 12-hour period. The selectivity was excellent, and the yield of o-thiocresol was 94.7 percent in a purity exceeding 99 percent. Both the identity and purity of the recovered o-thiocresol were established by infrared comparison with an authentic analytical grade sample. When the pot temperature was adjusted to 225–250° C. the reaction time was reduced to six hours with similar selectivity occurring. Silica-alumina, acidic montmorillonite clay, and fused zinc chloride were also effective as ring dealkylation catalysts, although conversions obtained were not as high as with solid phosphoric acid. Phosphoric acids: 85% phosphoric, 100% phosphoric, polyphosphoric, and commercial 35% metaphosphoric acids were all essentially ineffective as ring-dealkylation catalysts. Ring dealkylation results are summarized in Table V.

TABLE V.—RING DEALKYLATION OF 4-t-BUTYL-o-THIOCRESOL

For Runs A–E, solid phosphoric acid (UOP No. 2) was used as catalyst. Silica-alumina was used as catalyst in Run F. In Run G, an activated acid-washed montmorillonitic clay (KSF clay) was used; in Run H, fused zinc chloride was used.

| Run No. | A | B | C | D | E | F | G | H |
|---|---|---|---|---|---|---|---|---|
| Feed: | | | | | | | | |
| 4-t-butyl-o-thiocresol, percent | 95.6 | 100 | 100 | 100 | 100 | 100 | 100 | 100 |
| Mixed tolyl sulfides, percent | 4.4 | | | | | | | |
| Reaction conditions: | | | | | | | | |
| Temp., °C | 300 | 275 | 250 | 215 | 225–250 | 225–250 | 208–310 | 240–350 |
| Pressure, p.s.i.g | 75 | 50 | 50 | ¹225 | ¹425 | ¹425 | atm. | atm. |
| Catalyst vol., ml | 250 | 250 | 250 | ²10 | ²10 | ²10 | ²10 | ²15 |
| Feed rate, ml./min | 7.2 | 7.2 | 7.2 | | | | | |
| Linear hourly space velocity | 1.7 | 1.7 | 1.7 | | | | | |
| Reaction time, hrs | | | | 12 | 6 | 6 | 4 | 4.5 |
| Conversion, percent | 67.0 | 50.2 | 15.9 | 83.2 | 89.3 | 40.4 | 100 | 69.3 |
| Product distribution, percent: | | | | | | | | |
| Toluene | 5.1 | 14.1 | 10.2 | 3.5 | 1.9 | Trace | ³8 | Trace |
| o-Thiocresol | 88.0 | 72.1 | 89.8 | 94.7 | 96.3 | 96.1 | 41 | 78.5 |
| (High-boiling sulfur compounds) | 6.9 | 13.8 | | 1.8 | 1.8 | 3.9 | | 2 |
| o-Thiocresol purity: | | | | | | | | |
| o-Thiocresol | 71.3 | 87.1 | 97.8 | 99.1 | 99.3 | 98.1 | 99+ | 93.3 |
| m-Thiocresol | 14.4 | 5.8 | } 2.2 | { 0.2 | 0.8 | 1.8 | 0.0 | 3.0 |
| p-Thiocresol | 14.3 | 7.1 | | { 0.7 | 0.0 | 0.0 | 0.0 | 3.7 |

¹ Millimeters mercury.   ² Percent by weight of feed.   ³ t-Butyltoluene.

EXAMPLE 10

Separation of Meta- and Parathiocresols From Their Mixtures

A 907-gram sample of t-butyl tolyl sulfides (3% ortho, 76% meta, 21% para by infrared), recovered from the t-butylation of mixed thiocresols, was subjected to fine fractionation on a 1 in. x 48 in. Cannon-packed column (estimated 20–25 theoretical plates) at a 15–20:1 reflux ratio under 50 mm. Hg pressure. Distillate was collected and analyzed (infrared) as follows:

| Fraction | Boiling point (°C.) | Net weight (grams) | Percent of charge |
|---|---|---|---|
| Fore-run | 115–136.5 | 20 | 2.2 |
| t-Butyl m-tolyl sulfide (1.4% ortho, 94.5% meta, 4.1% para) | 136.5 | 274 | 30.2 |
| Intermediate | 136.5–139.5 | 478 | 52.7 |
| t-Butyl p-tolyl sulfide (0.6% meta, 99.4% para) | 139.5 | 127 | 14.0 |
| Residue and losses | | 8 | 0.9 |

A similar fractionation was carried out on a 2 in. x 7 ft. Cannon column (estimated 45 theoretical plates) to yield 34.3% of the lower-boiling distillate as 99+% t-butyl m-tolyl sulfide (vapor phase chromatography and infrared).

EXAMPLE 11

Sulfide-Cleavage Debutylation of t-Butyl Tolyl Sulfides

Selected samples of t-butyl m-tolyl p-tolyl sulfides obtained from the run shown in Example 10 were separately debutylated over solid phosphoric acid catalyst (UOP #2) at 160–170° C. under 200 mm. Hg pressure. Distillate was redistilled prior to analysis. In each case, almost quantitative yields of the corresponding thiocresols were readily obtained. Isomeric purity was determined by infrared analysis to be 98+% in each case.

Specific reaction conditions and results were as follows:

|  | t-Butyl metatolyl sulfide | t-Butyl paratolyl sulfide |
|---|---|---|
| Initial weight, g | 454 | 120 |
| Catalyst concn. weight % | 10 | 10 |
| Reaction temp. range, °C | 164–167 | 167–184 |
| Pressure, mm. Hg | 200 | 200 |
| Time, hr | 1.5 | 1.5 |
| Conversion, mole percent | 86 | 83.4 |
| Thiocresol yield, mole percent | 97.5 | 97.0 |
| Thiocresol purity, percent | 99+ | 99.3 |

EXAMPLE 12

Sulfide Cleavage of t-Alkyl Aryl Sulfides

Various acid catalysts were found effective in the sulfide cleavage of the t-alkyl group from t-alkyl aryl sulfides. The reaction conditions and the results obtained are summarized in Table VI.

TABLE VI.—SULFIDE CLEAVAGE OF t-ALKYL ARYL SULFIDES

| Sulfide | Gram moles | Catalyst, weight (g.) | Atm. reflux temp., °C. | Time,[1] hours | Conversion of sulfide, percent | Products (mole percent of converted sulfide) | |
|---|---|---|---|---|---|---|---|
|  |  |  |  |  |  | Thiol | Olefin |
| t-Butyl phenyl | 1.5 | Aluminum thiophenoxide 34 | 180–190 | 2 | 100 | 92 | 95 |
| Do | 1.0 | Aluminum o-cresoxide 2/53 [2] | 195–197 | 7 | 91 | 94 | 65 |
| Do | 0.71 | 85% orthophosphoric acid 5 | 179–185 | 6 | 80 | 95 | 95 |
| Do | 0.71 | p-Toluenesulfonic acid 10 | 178–187 | 3 | 99.6 | [3] 78 | 56 |
| t-Nonyl phenyl | 0.48 | Aluminum thiophenoxide 15 | 158–180 | 2.5 | 100 | 88 | 92 |
| t-Nonyl 4-t-nonylphenyl | 1.4 | Aluminum thiophenoxide 66 | 265–296 | 2.5 | Ca. 100 | [4] 7 | 92 |
| Do | 1.0 | Aluminum o-cresoxide 2.5/60 [2] | 326–338 | 0.75 | Ca. 85 | [5] 49 | 25 |
| t-Butyl 4-chlorophenyl | 0.25 | Aluminum thiophenoxide 7 | 156–204 | 4.5 | 68 | 98 | 88 |
| Do | 0.45 | 85% orthophosphoric acid 4 | 197–212 | 5.5 | 66 | 98 | 92 |

[1] Reaction time at the temperature indicated.
[2] Weight in grams aluminum/weight in grams o-cresol.
[3] Also obtained: 14.5 mole percent 4-t-butylthiophenol.
[4] The major products were thiophenol and materials boiling above nonylphenyl nonyl sulfide. The nonylthiophenol was 41% pure.
[5] The nonylthiophenol was 92% by titration (89% by infrared).

Many different combinations of thiocresols and their t-alkyl sulfides, particularly their t-butyl sulfides, may be separated in accordance with the process of this invention. Depending upon the specific proportions and components present in the mixture, it may be preferable to practice one or the other aspect of this invention or various combinations thereof. Thus in some instances alkylation in the presence of a selective ring-alkylating catalyst, as in the first aspect of this invention, will be preferred; in other instances, total sulfide formation using a nonselective catalyst may be desired; in still other instances, initial isomerization of a sulfide mixture may be employed; in yet other instances, a mixture of sulfides or a mixture of thiocresols and their sulfides may be first distilled. It is considered apparent that these are all variants of the process of this invention which is directed to separating hitherto unseparable mixtures of thiocresols and t-alkyl sulfides thereof. Thus the scope of this invention should be determined in accordance with the objects and claims thereof.

We claim:

1. In a process for refining a mixture containing at least one component selected from the group consisting of orthothiocresol and its t-alkyl sulfide and at least one other component selected from the group consisting of meta- and para thiocresols and their respective t-alkyl sulfides, the steps of reacting the mixture in the presence of a selective ring-alkylating catalyst to convert o-thiocresol and t-alkyl sulfide thereof present to ring-t-alkylated o-thiocresol and further to convert meta- and parathiocresols present to t-alkyl sulfide thereof and fractionally distilling the mixture to separately recover ring t-alkylated o-thiocresol and at least a sulfide selected from the group consisting of t-alkyl sulfides of meta- and parathiocresols.

2. The process according to claim 1 including the additional steps of ring dealkylating the separately recovered ring t-alkylated o-thiocresol to form o-thiocresol, and sulfide cleaving at least a sulfide selected from the group consisting of t-alkyl sulfides of meta- and parathiocresols to form the respective thiocresol isomer.

3. A process for refining mixed thiocresols containing orthothiocresol and at least one thiocresol selected from the group consisting of meta- and parathiocresols, which comprises t-alkylating said mixed thiocresols with a monoolefin having from 4 to 12 carbon atoms, and in which the alkyl substituent formed is a tertiary alkyl group, in the presence of a selective ring-alkylating catalyst to convert o-thiocresol to 4-t-alkyl-o-thiocresol by substitution by the alkyl group in the para position and further to convert meta- and parathiocresols present to t-alkyl sulfide thereof, fractionally distilling the mixture to separately recover 4-t-alkyl-o-thiocresol and at least a sulfide selected from the group consisting of t-alkyl sulfides of meta- and parathiocresols, ring dealkylating said 4-t-alkyl-o-thiocresol in the presence of a ring-dealkylation catalyst to form o-thiocresol, and sulfide cleaving at least a sulfide selected from the group consisting of t-alkyl sulfides of meta- and parathiocresols to form the respective thiocresol isomer.

4. The process according to claim 3 wherein said olefin is isobutylene.

5. A process for refining mixed thiocresols containing orthothiocresol and at least one thiocresol selected from the group consisting of meta- and parathiocresols, which comprises t-alkylating said mixed thiocresols with a monoolefin having from 4 to 12 carbon atoms, and in which the alkyl substituent formed is a tertiary alkyl group, in the presence of a selective ring-alkylating catalyst to convert o-thiocresol to 4-t-alkyl-o-thiocresol by substitution by the alkyl group in the para position and further to convert meta- and parathiocresols present to t-alkyl sulfide thereof, fractionally distilling the mixture to separately recover 4-t-alkyl-o-thiocresol and at least a sulfide selected from the group consisting of t-alkyl sulfides of meta- and parathiocresols, ring dealkylating said 4-t-alkyl-o-thiocresol in the presence of solid phosphoric acid as ring-dealkylation catalyst to form o-thiocresol, and sulfide cleaving at least a sulfide selected from the group consisting of t-alkyl sulfides of meta- and parathiocresols to form the respective thiocresol isomer.

6. A process for separately recovering at least orthothiocresol from a mixture of t-alkyl sulfides of thiocresol isomers containing the t-alkyl sulfide of o-thiocresol and at least a sulfide selected from the group consisting of t-alkyl sulfides of meta- and parathiocresols, which comprises reacting said mixture in the presence of a selective ring-alkylating catalyst to convert t-alkyl sulfide of o-thiocresol to 4-t-alkyl-o-thiocresol, fractionally distilling the mixture to separately recover 4-t-alkyl-o-thiocresol and at least a sulfide selected from the group consisting of t-alkyl sulfides of meta- and parathiocresols, ring dealkylating said t-alkyl-o-thiocresol in the presence of a ring-dealkylation catalyst to form o-thiocresol, and sulfide cleaving at least a sulfide selected from the group consisting of t-alkyl sulfides of meta- and parathiocresols to form the respective thiocresol isomer.

7. A process for recovering individual thiocresol isomers from a mixture consisting essentially of ortho-, meta-, and parathiocresols which comprises t-alkylating said mixture with a monoolefin having from 4 to 12 carbon atoms, and in which the alkyl substituent formed is a tertiary alkyl group, in the presence of a selective ring-alkylating catalyst to convert o-thiocresol to 4-t-alkyl-o-thiocresol by substitution by the tertiary alkyl group in the para position and further to convert meta- and parathiocresols to t-alkyl sulfides thereof, fractionally distilling the alkylated reaction mixture to separately recover each of 4-t-alkyl-o-thiocresol, t-alkyl m-tolyl sulfide, and t-alkyl p-tolyl sulfide, ring dealkylating the 4-t-alkyl-o-thiocresol in the presence of a ring-dealkylation catalyst to form o-thiocresol, and separately sulfide-cleaving the t-alkyl m-tolyl sulfide and t-alkyl p-tolyl sulfide to form m-thiocresol and p-thiocresol, respectively.

8. A process for recovering individual thiocresol isomers from a mixture consisting essentially of ortho-, meta-, and parathiocresols which comprises alkylating said mixture with isobutylene in the presence of a selective ring-alkylating catalyst to convert o-thiocresol to 4-t-butyl-o-thiocresol and further to convert meta- and parathiocresols to t-butyl sulfides thereof, fractionally distilling the butylated reaction mixture to separately recover each of 4-t-butyl-o-thiocresol, t-butyl m-tolyl sulfide, and t-butyl p-tolyl sulfide, ring dealkylating the 4-t-butyl-o-thiocresol in the presence of a ring-dealkylation catalyst to form o-thiocresol, and separately sulfide cleaving the t-butyl m-tolyl sulfide and t-butyl p-tolyl sulfide in the presence of a sulfide-cleavage catalyst to form m-thiocresol and p-thiocresol, respectively.

9. A process for recovering individual thiocresol isomers from a mixture consisting essentially of ortho-, meta-, and parathiocresols which comprises alkylating said mixture with isobutylene in the presence of a selective ring-alkylating catalyst to convert o-thiocresol to 4-t-butyl-o-thiocresol and t-butyl 4-t-butyl-o-tolyl sulfide and further to convert meta- and parathiocresols to t-butyl sulfides thereof, fractionally distilling the butylated reaction mixture to separately recover at least each of the four above-mentioned reaction products, sulfide cleaving the 4-t-butyl-o-tolyl sulfide in the presence of a sulfide-cleavage catalyst to form additional 4-t-butyl-o-thiocresol, and ring dealkylating 4-t-butyl-o-thiocresol in the presence of a selective ring-dealkylation catalyst to form o-thiocresol and isobutylene, and separately sulfide cleaving the t-butyl m-tolyl sulfide and t-butyl p-tolyl sulfide in the presence of a sulfide-cleavage catalyst to form m-thiocresol and p-thiocresol respectively and isobutylene.

10. In a process for refining a mixture containing at least one compenent selected from the group consisting of orthothiocresol and its t-alkyl sulfide and at least one other component selected from the group consisting of meta- and parathiocresols and their respective t-alkyl sulfides, the steps of reacting the mixture in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert o-thiocresol and t-alkyl sulfide thereof present to ring t-alkylated o-thiocresol and further to convert meta- and parathiocresols present to t-alkyl sulfide thereof and fractionally distilling the mixture to separately recover ring t-alkylated o-thiocresol and at least a sulfide selected from the group consisting of t-alkyl sulfides of meta- and parathiocresols.

11. The process according to claim 10 including the additional steps of ring dealkylating the separately recovered ring t-alkylated o-thiocresol to form o-thiocresol, and sulfide cleaving at least a sulfide selected from the group consisting of t-alkyl sulfides of meta- and parathiocresols to form the respective thiocresol isomer.

12. A process for refining mixed thiocresols containing orthothiocresol and at least one thiocresol selected from the group consisting of meta- and parathiocresols, which comprises t-alkylating said mixed thiocresol with a monoolefin having from 4 to 12 carbon atoms, and in which the alkyl substituent formed is a tertiary alkyl group, in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert o-thiocresol to 4-t-alkyl-o-thiocresol by substitution by the alkyl group in the para position and further to convert meta- and parathiocresols present to t-alkyl sulfide thereof, fractionally distilling the mixture to separately recover 4-t-alkyl-o-thiocresol and at least a sulfide selected from the group consisting of t-alkyl sulfides of meta- and parathiocresols, ring dealkylating said 4-t-alkyl-o-thiocresol in the presence of a ring-dealkylation catalyst to form o-thiocresol, and sulfide cleaving at least a sulfide selected from the group consisting of t-alkyl sulfides of meta- and parathiocresols to form the respective thiocresol isomer.

13. The process according to claim 12 wherein said olefin is isobutylene.

14. The process according to claim 12 wherein said ring-dealkylation catalyst is solid phosphoric acid.

15. A process for separately recovering at least orthothiocresol from a mixture of t-alkyl sulfides of thiocresol isomers containing the t-alkyl sulfide of o-thiocresol and at least a sulfide selected from the group consisting of t-alkyl sulfides of meta- and parathiocresols, which comprises reacting said mixture in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert t-alkyl sulfide of o-thiocresol to 4-t-alkyl-o-thiocresol, fractionally distilling the mixture to separately recover 4-t-alkyl-o-thiocresol and at least a sulfide selected from the group consisting of t-alkyl sulfides of meta- and parathiocresols, ring dealkylating said 4-t-alkyl-o-thiocresol in the presence of a ring-dealkylating catalyst to form o-thiocresol, and sulfide cleaving at least a sulfide selected from the group consisting of t-alkyl sulfides of meta- and parathiocresols to form the respective thiocresol isomer.

16. A process for recovering individual thiocresol isomers from a mixture consisting essentially of ortho-, meta-, and parathiocresols which comprises t-alkylating said mixture with a monoolefin having from 4 to 12 carbon atoms, and in which the alkyl substituent formed is a tertiary alkyl group, in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert o-thiocresol to 4-t-alkyl-o-thiocresol by substitution by the tertiary alkyl group in the para position and further to convert meta- and parathiocresols to t-alkyl sulfides thereof, fractionally distilling the alkylated reaction mixture to separately recover each of 4-t-alkyl-o-thiocresol, t-alkyl m-tolyl sulfide, and t-alkyl p-tolyl sulfide, ring dealkylating the 4-t-alkyl-o-thiocresol in the presence of a ring-dealkylating catalyst to form o-thiocresol, and separately sulfide-cleaving the t-alkyl m-tolyl sulfide and t-alkyl p-tolyl sulfide to form m-thiocresol and p-thiocresol, respectively.

17. A process for recovering individual thiocresol isomers from a mixture consisting essentially of ortho-, meta-, and parathiocresols which comprises alkylating said mixture with isobutylene in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert o-thiocresol to 4-t-butyl-o-thiocresol and further to convert meta- and parathiocresols to t-butyl sulfides thereof, fractionally distilling the butylated reaction mixture to separately recover each of 4-t-butyl-o-thiocresol, t-butyl m-tolyl sulfide, and t-butyl p-tolyl sulfide, ring dealkylating the 4-t-butyl-o-thiocresol in the presence of a ring-dealkylation catalyst to form o-thiocresol, and separately sulfide-cleaving the t-butyl m-tolyl sulfide and t-butyl p-tolyl sulfide in the presence of a sulfide-cleavage catalyst to form m-thiocresol and p-thiocresol, respectively.

18. The process according to claim 17 wherein said ring-alkylating catalyst is boron trifluoride-phosphoric acid complex.

19. The process according to claim 17 wherein said ring-dealkylation and sulfide-cleavage catalysts are solid phosphoric acid.

20. A process for recovering individual thiocresol isomers from a mixture consisting essentially of ortho-, meta-, and parathiocresols which comprises alkylating said mixture with isobutylene in the presence of a selective ring-alkylating catalyst selected from the group consisting of boron trifluoride, aluminum chloride, aluminum bromide, aluminum iodide, zirconium tetrachloride, and boron trifluoride-phosphoric acid complex to convert o-thiocresol to 4-t-butyl-o-thiocresol and t-butyl 4-t-butyl-o-tolyl sulfide and further to convert meta- and parathiocresols to t-butyl sulfides thereof, fractionally distilling the butylated reaction mixture to separately recover at least each of the four above-mentioned reaction products, sulfide-cleaving the t-butyl 4-t-butyl-o-tolyl sulfide in the presence of a sulfide-cleavage catalyst to form additional 4-t-butyl-o-thiocresol, and ring dealkylating 4-t-butyl-o-thiocresol in the presence of a selective ring-dealkylation catalyst to form o-thiocresol and isobutylene, and separately sulfide-cleaving the t-butyl m-tolyl sulfide and t-butyl p-tolyl sulfide in the presence of a sulfide-cleavage catalyst to form m-thiocresol and p-thiocresol respectively and iosbutylene.

21. A process for recovering individual thiocresol isomers from a mixture consisting essentially of ortho-, meta-, and parathiocresols which comprises alkylating said mixtures with isobutylene in the presence of boron trifluoride-phosphoric acid complex as selective ring-alkylating catalyst to convert o-thiocresol to 4-t-butyl-o-thiocresol and t-butyl 4-t-butyl-o-tolyl sulfide and further to convert meta- and parathiocresols to t-butyl sulfides thereof, fractionally distilling the butylated reaction mixture to separately recover at least each of the four above-mentioned reaction products, sulfide cleaving the t-butyl 4-t-butyl o-tolyl sulfide in the presence of solid phosphoric acid as sulfide-cleavage catalyst to form additional 4-t-butyl-o-thiocresol, ring dealkylating 4-t-butyl-o-thiocresol in the presence of solid phosphoric acid as selective ring-dealkylation catalyst to form o-thiocresol and isobutylene, and separately sulfide cleaving the t-butyl m-tolyl sulfide and t-butyl p-tolyl sulfide in the presence of solid phosphoric acid as sulfide-cleavage catalyst to form m-thiocresol and p-thiocresol respectively and isobutylene.

22. A process for recovering individual thiocresol isomers from a mixture consisting essentially of ortho-, meta-, and parathiocresols which comprises alkylating said mixture with isobutylene in the presence of boron trifluoride-100 percent phosphoric acid complex as catalyst at a temperature between 50 and 120° C. for a period of time between 30 minutes and 12 hours, lower temperatures requiring correspondingly longer times, to convert o-thiocresol to 4-t-butyl-o-thiocresol and t-butyl 4-t-butyl-o-tolyl sulfide and further to convert meta- and parathiocresols to t-butyl sulfides thereof, fractionally distilling the butylated reaction mixture to separately recover at least each of the four above-mentioned products, sulfide cleaving the t-butyl 4-t-butyl-o-tolyl sulfide in the presence of from 2 to 20 percent by weight of solid phosphoric acid as sulfide-cleavage catalyst at a temperature between 130 and 250° C. to form additional 4-t-butyl-o-thiocresol, ring dealkylating 4-t-butyl-o-thiocresol in the presence of from 2 to 20 percent by weight of solid phosphoric acid as ring-dealkylation catalyst at a temperature between 200 and 300° C. to form o-thiocresol and isobutylene, and separately sulfide cleaving the t-butyl m-tolyl sulfide and t-butyl p-tolyl sulfide in the presence of from 2 to 20 percent by weight solid phosphoric acid as sulfide-cleavage catalyst at a temperature between 130 and 250° C. to form m-thiocresol and p-thiocresol respectively and isobutylene.

No references cited.

UNITED STATES PATENT OFFICE
CERTIFICATE OF CORRECTION

Patent No. 3,084,199                      April 2, 1963

Metro D. Kulik et al.

It is hereby certified that error appears in the above numbered patent requiring correction and that the said Letters Patent should read as corrected below.

Column 3, line 30, for "thiocrasol" read -- thiocresol --; column 5, line 30, for "70,443" read -- 70,413 --; column 16, Table V, strike out the brace, in column D of the table; column 19, line 48, for "4-t-butyl-o-tolyl sulfide" read -- t-butyl 4-t-butyl-o-tolyl sulfide --.

Signed and sealed this 22nd day of October 1963.

(SEAL)
Attest:

ERNEST W. SWIDER                      EDWIN L. REYNOLDS
Attesting Officer                      Acting Commissioner of Patents